(12) United States Patent
Grummon

(10) Patent No.: US 6,260,818 B1
(45) Date of Patent: Jul. 17, 2001

(54) THIN FILM FLUID CONTROL SYSTEMS AND METHOD OF FABRICATING THE SAME

(75) Inventor: David S. Grummon, East Lansing, MI (US)

(73) Assignee: Board of Trustees Operating Michigan State University, East Lansing, MI (US)

( * ) Notice: Subject to any disclaimer, the term of this patent is extended or adjusted under 35 U.S.C. 154(b) by 0 days.

(21) Appl. No.: 09/601,080

(22) PCT Filed: Feb. 2, 1999

(86) PCT No.: PCT/US99/02228

§ 371 Date: Aug. 25, 2000

§ 102(e) Date: Aug. 25, 2000

(87) PCT Pub. No.: WO99/39118

PCT Pub. Date: Aug. 5, 1999

Related U.S. Application Data

(60) Provisional application No. 60/073,543, filed on Feb. 3, 1998.

(51) Int. Cl.$^7$ .......................................................... F16K 7/04
(52) U.S. Cl. ..................................................... 251/4; 251/11
(58) Field of Search ............................................ 251/4, 11

(56) References Cited

U.S. PATENT DOCUMENTS

| | | | |
|---|---|---|---|
| 5,325,880 | * | 7/1994 | Johnson et al. ........................... 137/1 |
| 5,619,177 | * | 4/1997 | Johnson et al. ....................... 337/140 |

* cited by examiner

*Primary Examiner*—John Fox
(74) *Attorney, Agent, or Firm*—Harness, Dickey & Pierce, P.L.C.

(57) ABSTRACT

The present invention discloses various embodiments of a thin film fluid control system (10, 110, 220) for controlling fluid flow through tubular conduits (24, 124, 224). The system is designed such that a shape memory alloy (14, 114, 214) is transformed between austenitic and martensitic phases to constrict or open the tubular conduit as desired.

18 Claims, 4 Drawing Sheets

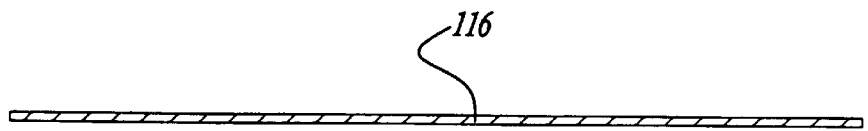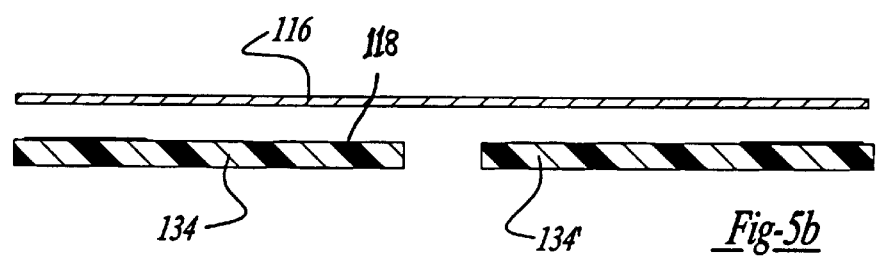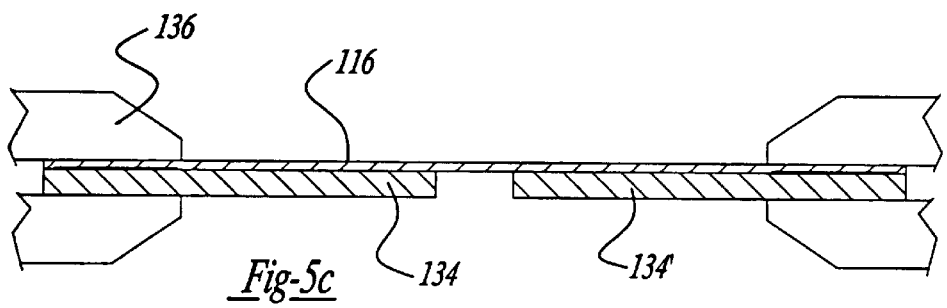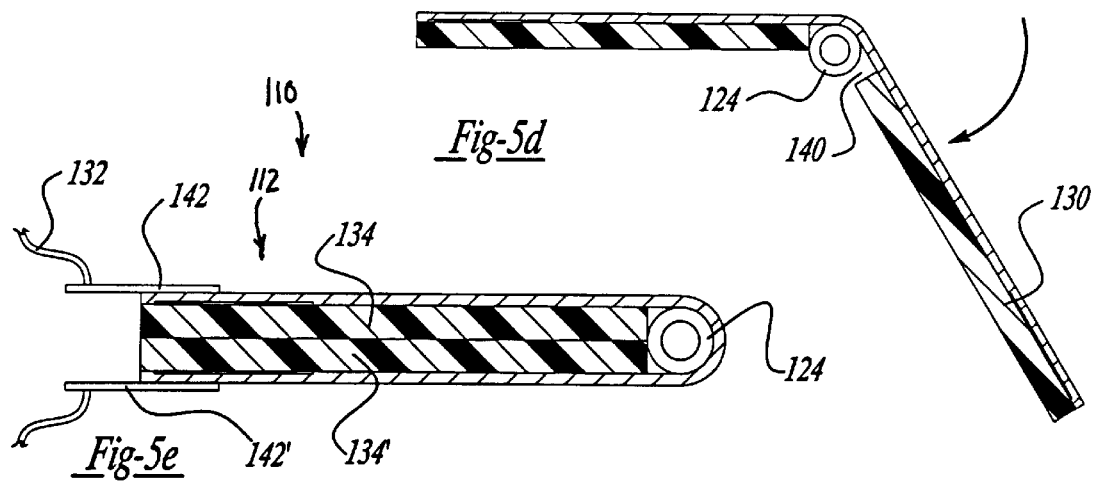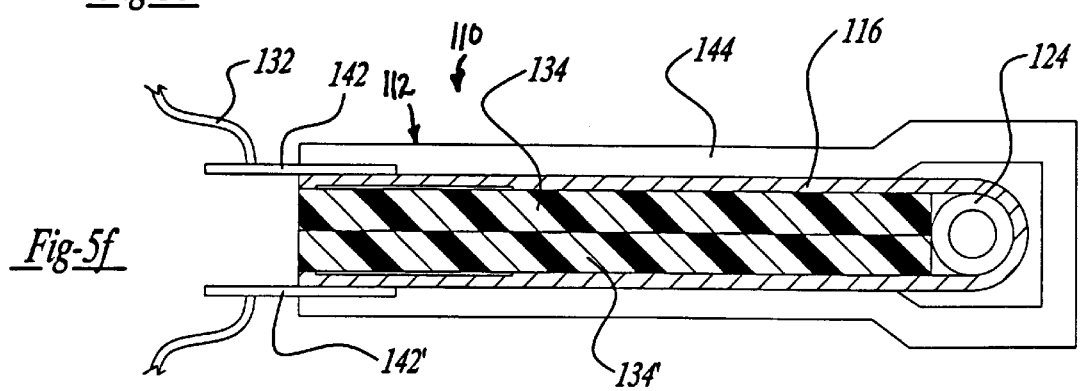

THIN FILM FLUID CONTROL SYSTEMS AND METHOD OF FABRICATING THE SAME

This application is a national stage of PCT/US99/002228 filed Feb. 2, 1999, which claims the benefit of Provisional Application 60/073,543, filed Feb. 3, 1998.

Work on this invention was sponsored in part by National Science Foundation Grant MSS9302770. The Government may have certain rights in the invention.

BACKGROUND OF THE INVENTION

The present invention relates to thin film fluid control systems and, more particularly, to the fabrication of microelectromechanical shape-memory thin film fluid control systems such as peristaltic pumps, for example, and methods of fabricating such devices.

The shape-memory effect employed under the present invention arises in certain metal alloys that undergo reversible displacive transformations ('martensite' transformations) in which, on cooling, the crystal lattice shears to a new crystal symmetry, with no diffusion occurring, and very little volume change. The strain produced during a shape-memory transformation can produce very large forces that are useful to carry out work.

To produce a shape-memory displacement, the appropriate alloy is first cooled to a temperature at which the structure is fully martensitic, that is, to a temperature below the 'martensite-finish' temperature, hereinafter $M_f$. If the cooling is done in the absence of stress, the martensite is self-accommodated, and contains a nearly random distribution of 24 variants of the sheared structure, such that the macroscopic deformation is nominally zero. If the martensite is now subjected to an applied stress it can be permanently deformed, but the deformation which takes place is not mediated by dislocation slip, but rather by a cooperative rearrangement of the individual martensite variants via twin-boundary motion. Shape-change occurs by motion of the intervariant boundaries in a way which increases the size of the shear-variants aligned with the deforming stress, while variants which have shears in the antisense of the applied stress shrink or disappear.

The shape-memory effect is manifest when this material is heated to a temperature at which the martensite reverts to the high-temperature phase. This process begins at $A_s$, the austenite-start temperature, and is complete at $A_f$, the austenite finish temperature. During the transformation, each variant transforms from its monoclinic (low-symmetry) structure back to the high temperature (cubic) structure; since the crystal symmetry is increased, each martensite variant has only one way it can shear to form the parent symmetry. This shear is always the exact opposite of the shear which initially formed the variant, and the material therefore recovers not only the transformational shears (which were self-accommodated) but also the shears imparted by the deforming stress, since the latter were 'descended' from the original variants. The result is a recovery ('memory') of the shape held prior the deformation of the martensite.

If the alloy is again cooled below $M_f$, the transformation once again produces a 'random' martensite that will not exhibit shape-memory unless it is again deformed by application of external stress. Thus the exploitation of the effect to make a reversible, cyclic actuator requires the use of a 'biasing' element to provide the force needed to deform the martensite phase on cooling.

The so-called shape memory effect is described in relative detail in U.S. Pat. No. 5,325,880 by Johnson et al. which describes a microvalve in the form of a poppet formed of a shape memory alloy. The poppet is suspended within a pressure cavity defined by a base and a valve cap formed of silicon. By applying heat to the shape memory alloy, the alloy blocks the port to preclude fluid flow.

U.S. Pat. No. 5,619,177 which is also by Johnson et al. relates to a more elaborate microactuator wherein the actuator member is comprised of a shape memory alloy layer, an elastic substrate, a base including a first layer of silicon and a second layer of a charge carrying material. In order to activate the apparatus, a heating circuit and a clamping circuit are provided whereby one is held open and the other is held closed to open or close an orifice provided within the base.

While the devices described in the foregoing patents may be useful for the stated purposes, the apparatuses disclosed do not appear to be useful in association with tubular conduits generally and, more particularly, delicate conduits such as biological conduits, i.e., blood vessels and urethras by way of non-limiting example. Neither of the Johnson et al. references appear to be capable of a retrofit application, i.e., installed and used in association with an existing conduit. As such, there is a clear need for the thin film fluid control systems of the present invention.

SUMMARY OF THE INVENTION

In view of the foregoing, a high-efficiency fluid control system in accordance with the present invention generally comprises two principal elements: an actuating element in the form of a shape-memory alloy which produces a large strain when heated from the martensitic form to the austenitic form, and a spring element which stores some of the strain energy released by the shape memory alloy and makes such energy available to reset the martensitic form during the cooling phase of the actuation cycle.

By way of non-limiting example, a high-capacity thin film peristaltic pump in accordance with the teachings of the present invention uses a plurality of segregated titanium-nickel thin-film bands which are tensilized in the martensitic condition and wrapped around a rigid core to capture a flexible tubular member which optionally may be pre-primed with the fluid to be pumped. A properly phased driving signal sequentially excites the TiNi bands to effect peristaltic action. A simplified uniband version may function as a positive shutoff valve.

The bias forces of the present designs are derived directly from the resilience of the tubing as it is pinched, and augmented as necessary by additional forces generated from encapsulants and other packaging materials. No discrete assembly of special springs is required.

The fluid control system of the present invention, i.e., valves and pumps employing tubular conduits, offer numerous advantages over previously known fluid control systems. For example, the fluid control systems of the present invention can be produced at arbitrarily small scales. Tubular members with diameters less than 200 micrometers may be used in extremely compact systems, thus the size will be limited in principal only by the dimensions of the tubular member.

An additional advantage relates to applying the system to a pre-existing tubular member. As such, the fluid control system can be applied in biological systems to control fluid flow, i.e., wrapped around veins and arteries, gas delivery systems, intravenous drug, blood and nutrient transfer tubular members, by way of non-limiting example. It should therefore be understood that the term "fluid" as used herein includes gases and/or liquids generally.

Since the actuating element is mechanically stable in the sense that buckling instabilities are generally avoided, the system will also be adaptable to larger tubing, i.e. flexible tubular members limited primarily by the maximum thickness available based on known flexible tube processing techniques. In this regard it is estimated that a 25 micrometer thick (0.001") titanium-nickel thin film will have the ability to generate closure forces on tubes exceeding 10 Newtons per millimeter, or approximately 50 pounds per lineal inch of tubing. These forces are more than sufficient to effect closure and peristalsis for a variety of tubing materials.

The systems of the present invention are simple and inexpensive to manufacture and are subject to low capital cost.

The systems of the present invention, through the use of high-transformation shape-memory alloy thin films such as TiNi systems, for example, are useful at high ambient temperature and under severe environments.

The systems of the present invention may also be retrofit; that is, the thin film fluid control systems of the present invention may be deployed in the field on a user-supplied, pre-primed tube such as intravenous fluid, drug delivery and metering, for example.

The systems of the present invention are also adaptable to applications requiring collocation of drive and/or sensor electronics on electronic grade silicon substrates.

The low cost and modest power consumption make the systems attractive for use with consumer products such as those used for dispensing insect repellants, air freshening products, cosmetics, flavorings, beverages, household cleaners, insect control products, perfumes, and the like.

The design exploits the displacement output abilities of the active thin film material with maximums up to high-cycle fatigue limits, and generates stresses that are similarly well within the capacity of titanium-nickel and related alloys.

Another important advantage of the present invention is that it lends itself to low-cost, high-volume automated manufacture.

Still other advantages and objects of the invention will be realized upon review of the following drawings and detailed description of the invention.

BRIEF DESCRIPTION OF THE DRAWINGS

FIGS. 5(a–f) demonstrate the progressive assembly of a thin film fluid control system of the present invention;

DETAILED DESCRIPTION OF THE INVENTION

The fluid control systems of the present invention may best be understood by describing various alternative embodiments based on the same generic concept.

Figure 1:
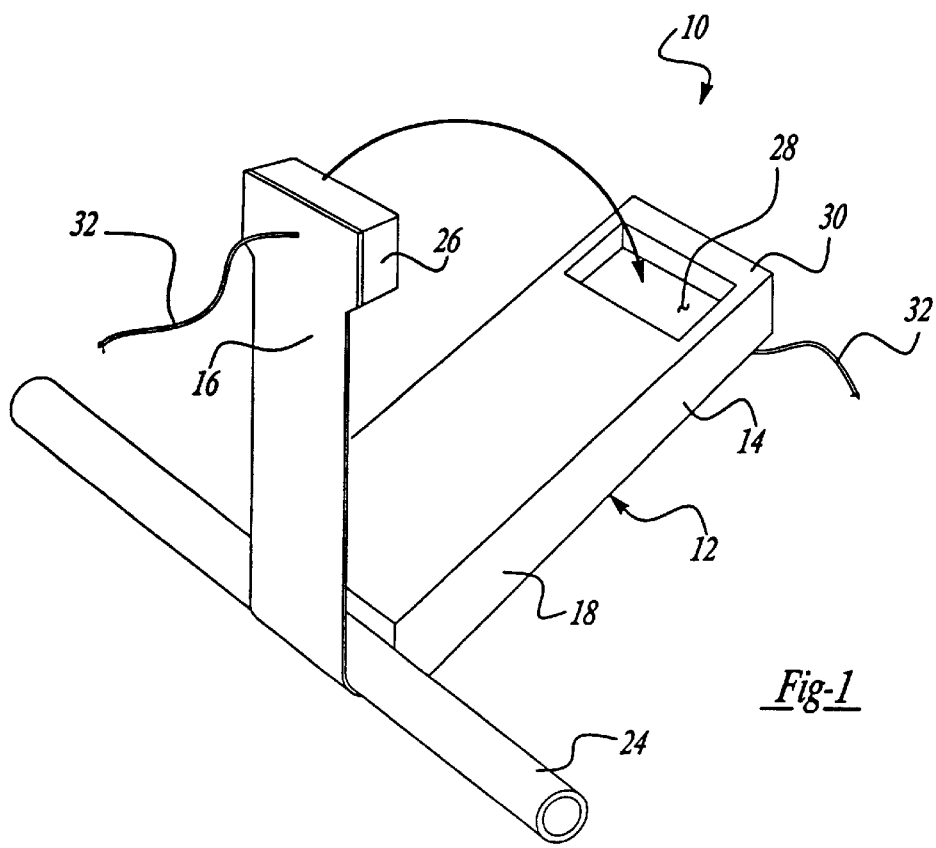
FIG. 1 is a perspective view of a partially assembled thin film fluid control system of the present invention.
Figure 2:
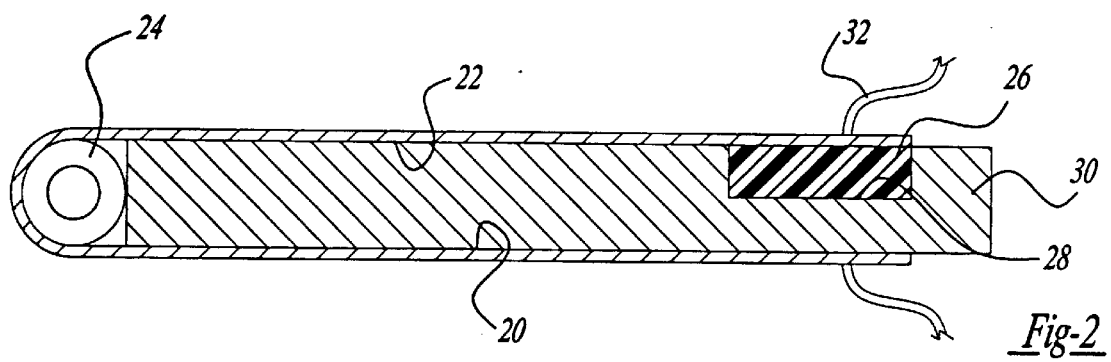
FIG. 2 is a side elevation view of the thin film fluid control system of the FIG. 1 shown in a static state.
Figure 3:
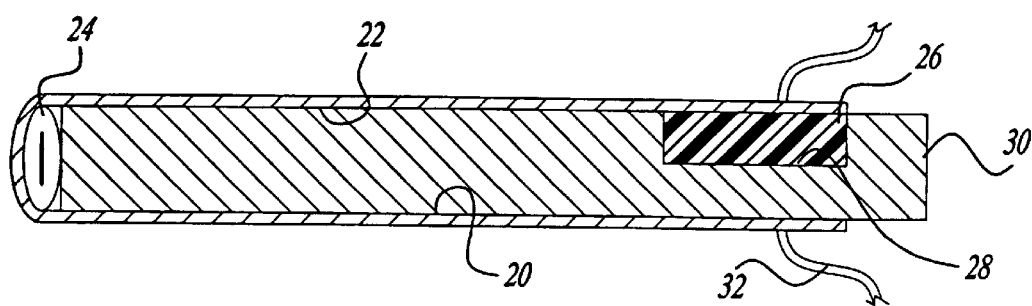
FIG. 3 is a side elevation view of the thin film fluid control system of FIG. 1 in an active state.

Referring to FIGS. 1–3, there is shown a first embodiment of a fluid control system 10 in accordance with the present invention. The fluid control system includes at least one fluid control element 12 including an actuating element 14 in the form of a shape memory alloy 16 and a spring bias element 18. The shape memory alloy which is processed using any one of a number of known techniques is generally adhered to a first side 20 of the spring bias element, stretched over a tubular conduit 24 and adhesively or otherwise attached to a second side 22 of the spring bias element. As demonstrated, the actuating element 14 is provided with a block 26 of polymeric material which is plugged into a socket 28 provided along a first end 30 of the spring bias element. Lead wires 32 are spot welded or otherwise attached to the shape memory alloy 16 of the actuating element for applying a charge of energy to the system.

The shape memory alloy 16 of the actuating element 14 is generally maintained in a martensitic state. However, upon charging the element via wires 32 the alloy is heated from the martensitic form to the austenitic form which causes the shape memory alloy to contract and pinch the tubular conduit 24 to limit or restrict fluid flow as demonstrated in FIG. 3.

By discontinuing the charge, the spring element 18 releases some of the energy stored which energy assists in returning the shape memory alloy of the actuating element to its original shape as found during the martensitic state. by employing sensors and a computer (not shown) in associationg with the fluid control systems of the present invention, fluid flow can be systematically controlled.

Figure 4:
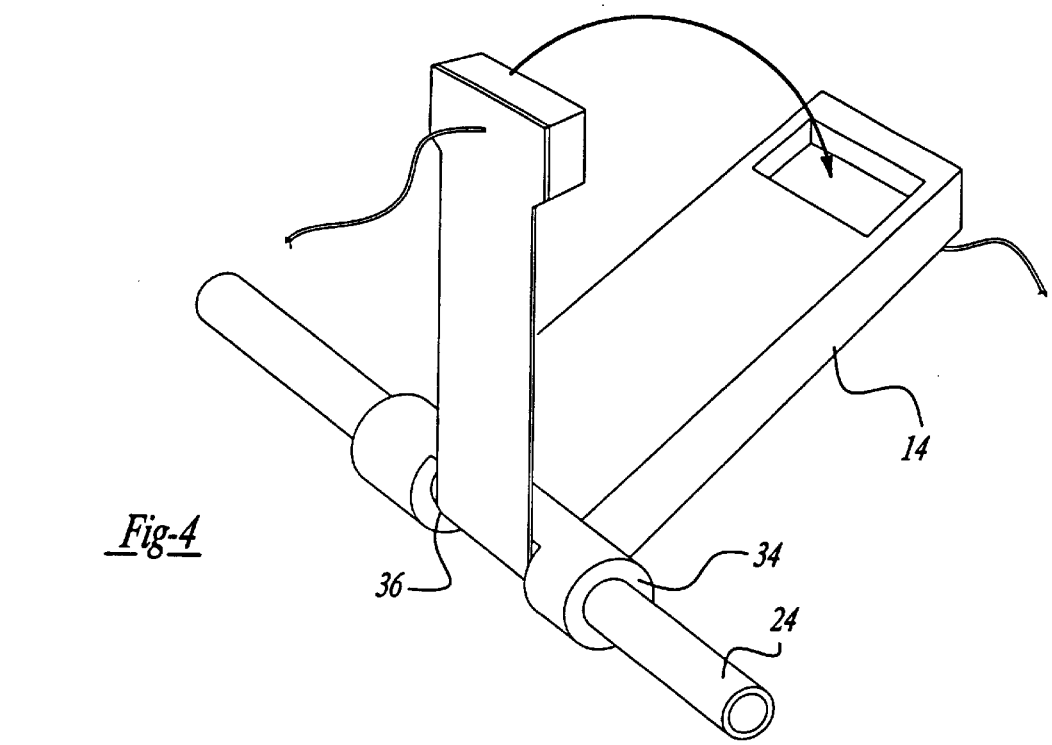
FIG. 4 is a perspective view of the thin film fluid control system of FIGS. 1–3 incorporating a reinforcing cylinder to protect the tubular conduit.

Referring to FIG. 4, an embodiment similar to that of FIGS. 1–3, is shown including a reinforcing sleeve 34 having a cutout portion 36 for receiving the shape memory alloy 16 of actuating element 14. As current is applied causing a phase change and thus constriction of the shape memory alloy, the reinforcing sleeve serves to support the tubular member 24 while the tube is constricted.

Referring to FIGS. 5a–5f, the progressive assembly of a second fluid control system embodiment 110 is shown. The second embodiment 110 includes at least one fluid control element 112 including an actuating element 114. The actuating element includes a layer of shape memory alloy material 116 adhesively applied to a spring bias element 118 in the form of a pair of spaced apart plates 134 and 134', respectively. Thereafter, shape memory alloy 116 and plates 134 and 134' are clamped together via clamps 136 to promote adhesion and to effectuate a controlled tensile displacement to the shape memory alloy. By pulling the clamps apart, a load displacement of approximately 2–3 Newtons is applied while the alloy is sufficiently cool so as to be fully martensitic. In this manner, the martensite is detwinned up to about 10%, more particularly 4–8%.

Upon removing the element from the clamps, a first end 130 of the element is bent over a tubular conduit 124 which is inserted into the gap 140 provided between the two plates 134 and 134'. The bending preferably continues until the two plates 134 and 134' are stacked together as shown in FIG. 5e. Thereafter, electrically conductive bands 142 and 142' are welded to the opposite ends of shape memory alloy and lead wires 132 are subsequently attached.

Optionally, but preferably, the entire fluid control element 112, except for the bands and lead wires, are encapsulated in a polymeric resin 144 as shown in FIG. 5f to preclude undesired displacement of the now formed system. Again, the tubular conduit 124 can be pinched closed by applying an electrical charge, thus causing a deformation of the shape memory alloy.

Referring to FIGS. 6a–6f, another thin film fluid control system 210 is illustrated as a progressive assembly. Again, the fluid control element 212 includes an actuating element 214 of shape memory material 216 and a spring bias element 218 of multiple spaced apart plates 234 and 234'. The shape memory alloy 216 is adhesively attached or, more preferably, sputter deposited onto the plates 234 and 234'.

Figure 6A:
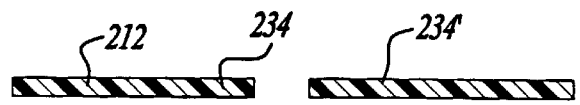
FIGS. 6(a–f) demonstrate the progressive assembly of another thin film fluid control system of the present invention.
Figure 6B:
Figure 6C:
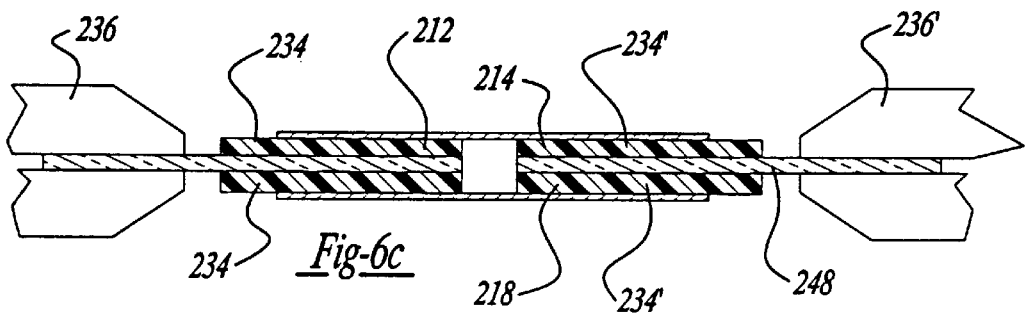
Figure 6D:
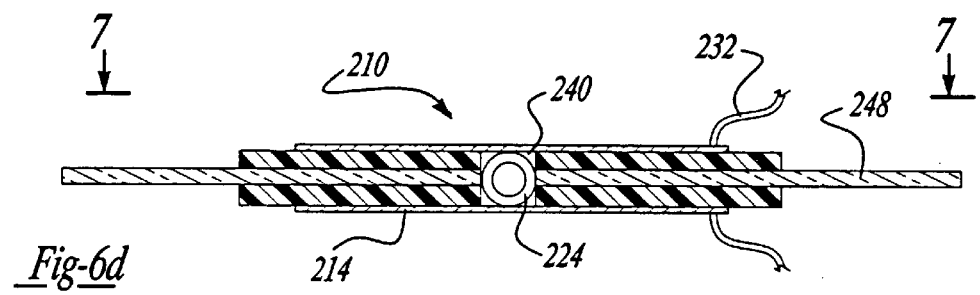

In the case of brittle substrates (plates) such as silicon, the plates can be adhered together bottom face to bottom face, to a common central metallic handling plate 248 as shown in FIG. 6c, using an appropriate adhesive bonding material. The center plate extends beyond the ends of the substrate plates sufficiently so as to allow clamping of the assembly in a tensile deformation apparatus. Under certain embodiments it may be desirable to use a set of the spaced apart plates 234 and 234' along each side of the central plate as shown in FIG. 6c. Once the assembly is properly clamped, the clamps 236 and 236' can be moved away from each other to deform the element up to about 10%, more preferably between 4–8%, while the film is in the martensitic phase as described above.

Figure 6E:
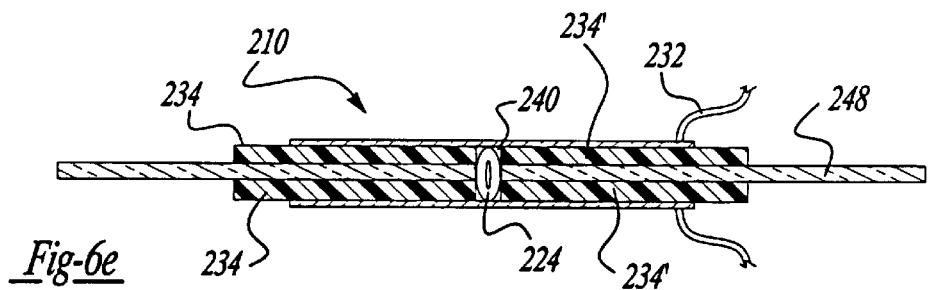
Figure 6F:
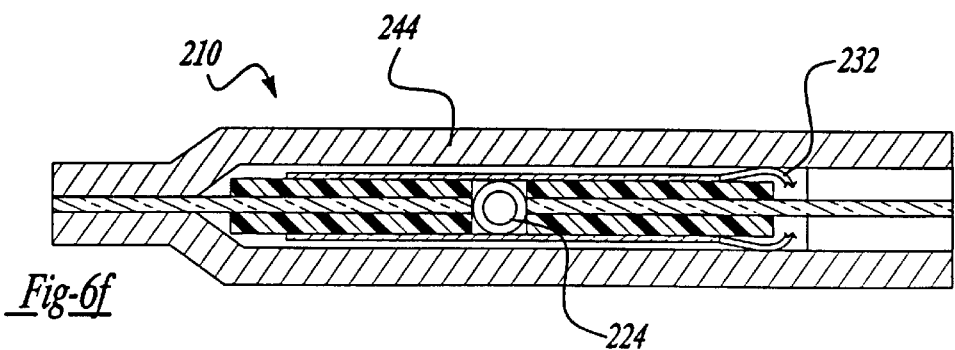

Upon deforming the element, lead wires 232 are attached, and the device can be encapsulated in a rigid, protective casing 244 as shown in FIG. 6f which allows for relative displacement of the plates, but confines their displacement to a planar translation along the axis of the deposited strip of thermoactive material as illustrated in FIG. 6e. The tubular member 224 of the system is thereafter inserted into the cavity 240 and the fluid control system 210 should be operational.

Figure 7:
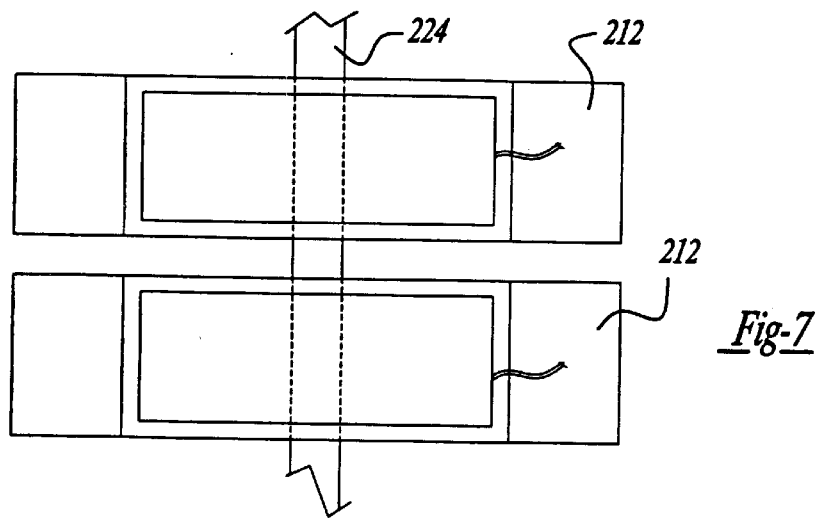
FIG. 7 is a top view of a plurality of the fluid control elements of FIG. 6e arranged in series.

As illustrated in FIG. 7, a plurality of individual thin film fluid control elements 212 may be applied over a tubular member 224 such that fluid flow can be controlled intermittently as fluid advances through the conduit.

Figure 8:
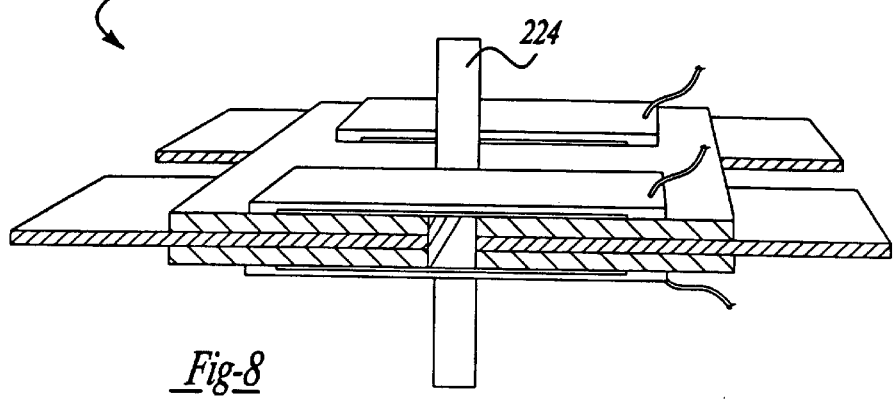
FIG. 8 is a perspective view of an alternative thin film fluid control system of the present invention.

As illustrated in FIG. 8, the tubular member 224 of the thin film fluid control system 210 may be disposed out of plane, i.e., in an orientation normal to the plane of the element.

Still other variations of the above described embodiment include those in which the film is deposited to metallic substrates (again with good adhesion at the ends, and inhibited adhesion along the central 'gage section'). This design deletes the central handling plate and allows direct gripping of a cemented pair of thermotractors for tensilization. It also potentially facilitates electrical connections, but requires that the glue joint between the plates provide electrical insulation. The upper and lower thermotractors could be wired in series to increase the electrical impedance.

While it will be apparent that the preferred embodiments of the invention disclosed are well calculated to fulfill the objects stated, it will be appreciated that the invention is susceptible to modification, variation and change without departing from the spirit thereof.

What is claimed is:

1. A fluid control system comprising:

a flexible tubular member; and a fluid flow control element including a selectively deformable actuating element formed from a shape memory alloy including electrical lead wires and a biasing spring, said deformable actuating element being convertible between a first shape occurring when said shape memory alloy is in an austenite phase and a second shape when said shape memory alloy is in a martensite phase;

whereby upon applying an electrical charge to said actuating element, said shape memory alloy contracts due to a phase change, thereby pinching said tubular member closed.

2. The fluid control system of claim 1 wherein a plurality of said fluid flow control elements are applied in series along a tubular member.

3. The fluid control system of claim 1 wherein said shape memory alloy is titanium nickel alloy.

4. The fluid control system of claim 3 wherein said titanium nickel alloy is TiNiX, wherein X is selected from the group consisting essentially of hafnium, zirconium, palladium, platinum, gold and copper.

5. The fluid control system of claim 1 wherein said tubular member has a diameter of as small as 200 micrometers.

6. The fluid control system of claim 1 wherein shape memory alloy is capable of generating closure forces of about 50 pounds per linear inch.

7. The fluid control system of claim 1 wherein said flexible tubular member is a blood vessel.

8. The fluid control system of claim 1 wherein said flexible tubular member is polymeric.

9. The fluid control system of claim 1 wherein said shape memory alloy is deformable in tension up to about 10%.

10. A fluid control system for controlling fluid flow through a flexible tubular member, comprising:

a flow control element including a selectively deformable actuating element formed from a shape memory alloy including electrical lead wires and a biasing spring, said deformable actuating element being convertible between a first shape occurring when said shape memory alloy is in an austenite phase and a second shape when said shape memory alloy is in a martensite phase;

whereby upon applying an electrical charge to said actuating element, said shape memory alloy contracts due to a phase change, thereby pinching said tubular member closed.

11. The fluid control system of claim 10 wherein a plurality of said fluid flow control elements are applied in series along a tubular member.

12. The fluid control system of claim 10 wherein said shape memory alloy is titanium nickel alloy.

13. The fluid control system of claim 12 wherein said titanium nickel alloy is TiNiX, wherein X is selected from the group consisting essentially of hafnium, zirconium, palladium, platinum, gold and copper.

14. The fluid control system of claim 10 wherein said tubular member has a diameter of as small as 200 micrometers.

15. The fluid control system of claim 10 wherein shape memory alloy is capable of generating closure forces of about 50 pounds per linear inch.

16. The fluid control system of claim 10 wherein said flexible tubular member is a blood vessel.

17. The fluid control system of claim 10 wherein said flexible tubular member is polymeric.

18. The fluid control system of claim 10 wherein said system is deformable in tension up to about 10%.

* * * * *